(12) United States Patent
Lyon et al.

(10) Patent No.: US 8,497,417 B2
(45) Date of Patent: *Jul. 30, 2013

(54) INTERVALGRAM REPRESENTATION OF AUDIO FOR MELODY RECOGNITION

(75) Inventors: Richard F. Lyon, Los Altos, CA (US); Thomas C. Walters, San Francisco, CA (US); David Ross, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,096

(22) Filed: Mar. 9, 2012

(65) Prior Publication Data

US 2012/0160078 A1    Jun. 28, 2012

Related U.S. Application Data

(63) Continuation of application No. 12/826,623, filed on Jun. 29, 2010, now Pat. No. 8,158,870.

(51) Int. Cl.
*A63H 5/00* (2006.01)

(52) U.S. Cl.
USPC .......................................................... 84/609

(58) Field of Classification Search
USPC .......................................................... 84/609
See application file for complete search history.

(56) References Cited

U.S. PATENT DOCUMENTS

| 8,115,089 | B2 | 2/2012 | Saino et al. | |
| 8,116,746 | B2 * | 2/2012 | Lu et al. | 455/414.1 |
| 2002/0069073 | A1 | 6/2002 | Fasciano | |
| 2005/0281410 | A1 | 12/2005 | Grosvenor | |
| 2007/0038446 | A1 | 2/2007 | Shen et al. | |
| 2007/0131094 | A1 | 6/2007 | Kemp | |
| 2008/0221881 | A1 | 9/2008 | Carraux et al. | |
| 2008/0223200 | A1 | 9/2008 | Kwak | |
| 2009/0025540 | A1 | 1/2009 | Hillborg | |

OTHER PUBLICATIONS

PCT International Search Report and Written Opinion, PCT/US2011/041681, Feb. 9, 2012, 6 pages.
Baluja, S., et al., "Waveprint: Efficient wavelet-based audio fingerprinting," Pattern recognition, 2008, pp. 3467-3480, vol. 41, No. 11.
Bertin-Mahieux, T., et al., "Large-scale cover song recognition using hashed chroma landmarks," In Proceedings of the International Symposium on Music Information Retrieval (ISMIR), Oct. 16-19, 2011, 4 pages.
Casey, M., et al., "Analysis of minimum distances in high-dimensional musical spaces," IEEE Transactions on Audio, Speech, and Language Processing, Jul. 2008, pp. 1015-1028, vol. 16, No. 5.
Ellis, D., et al., "The 2007 LabROSA cover song detection system," MIREX2007 Audio Cover Song Evaluation system description, 2007, 5 Pages.

(Continued)

*Primary Examiner* — Jianchun Qin
(74) *Attorney, Agent, or Firm* — Fenwick & West LLP

(57) ABSTRACT

A system, method, and computer readable storage medium generates an audio fingerprint for an input audio clip that is robust to differences in key, instrumentation, and other performance variations. The audio fingerprint comprises a sequence of intervalgrams that represent a melody in an audio clip according pitch intervals between different time points in the audio clip. The fingerprint for an input audio clip can be compared to a set of reference fingerprints in a reference database to determine a matching reference audio clip.

16 Claims, 7 Drawing Sheets

OTHER PUBLICATIONS

Ives, D., et al., "Pitch strength decreases as f0 and harmonic resolution increase in complex tones composed exclusively of high harmonics," The Journal of the Acoustical Society of America, May 2008, pp. 2670-2679, vol. 123, No. 5.

Marolt, M., "A mid-level representation for melody-based retrieval in audio collections," IEEE Transactions on Multimedia, Dec. 2008, pp. 1617-1625, vol. 10, No. 8.

Ravuri, S., et al., "Cover song detection: from high scores to general classification," IEEE International Conference on Acoustics Speech and Signal Processing (ICASSP), 2010, pp. 65-68.

Serra, J., Identification of versions of the same musical composition by processing audio descriptions. PhD thesis, Universitat Pompeu Fabra, 2011, 185 Pages.

Tsai, W., et al., "Using the similarity of main melodies to identify cover versions of popular songs for music document retrieval," Journal of Information Science and Engineering, 2008, pp. 1669-1687, vol. 24.

Wang, A., "An industrial strength audio search algorithm," In International Conference on Music Information Retrieval (ISMIR), Oct. 26-30, 2003, pp. 7-13, vol. 2.

Yang, C., Music database retrieval based on spectral similarity. In Proceedings of the International Symposium on Music Information Retrieval (ISMIR), 2001, 2 pages.

Office Action for U.S. Appl. No. 13/615,061, Dec. 14, 2012, 7 Pages.

\* cited by examiner

INTERVALGRAM REPRESENTATION OF AUDIO FOR MELODY RECOGNITION

CROSS-REFERENCE TO RELATED APPLICATION

This application is a continuation of U.S. patent application Ser. No. 12/826,623, now U.S. Pat. No. 8,158,870, entitled "Intervalgram Representation of Audio for Melody Recognition" to Lyon, et al., filed Jun. 29, 2010, which is incorporated by reference herein in its entirety.

BACKGROUND

1. Field of Art

The invention generally relates to audio processing and more specifically to recognizing melodies in audio clips.

2. Description of the Related Art

Electronic media libraries may contain thousands or millions of video and/or audio files, making management of these libraries an extremely challenging task. A particularly challenging problem involves identifying songs within user-uploaded video or audio files. Song recognition is important for several reasons. First, song recognition allows media hosting services to detect user-uploaded media files that contain copyrighted music, and to obtain an appropriate license to remove such content. Second, song recognition allows media hosting services to generate targeted advertisements such as, for example, by providing hyperlinks directing a listener/viewer to a web site for purchasing the song or a related album. Third, song recognition allows media hosting services to automatically index media files so that users can more efficiently search for media content containing a particular song.

While user-uploaded audio content is sometimes identifiable by the file name or other metadata, these labels are often incorrect or insufficient to fully identify the audio content. An alternate approach of using humans to manually label songs in audio or video files is expensive, time consuming, and becomes increasingly unfeasible as media libraries become larger. Therefore, an automated technique for song recognition is desirable.

Traditionally, automated song recognition requires a nearly exact match between an input audio file and a labeled reference audio file. This traditional technique cannot detect matches between different recordings of the same song (e.g., matching a cover song to the original), when the song is transposed to a different key, or when different instrumentation is used.

SUMMARY

A system, method, and computer readable storage medium generates an intervalgram representation for an input audio clip. The intervalgram representation efficiently represents the melodic structure of an audio clip and is robust against key transpositions, changes in instrumentation, and other variations in the recording of a musical performance. This representation allows for more consistent, accurate and universal recognition of music across different performances by different artists, including identification of "cover" recordings.

The intervalgram representation comprises a sequence of intervalgram blocks with each intervalgram block associated with a different time period within the audio clip. Each of these intervalgram blocks represents a distribution of pitch intervals occurring between different sub-periods (i.e. time bins) within the time period of the intervalgram. Representation of pitch intervals over time allows for accurately identifying the melody in an audio clip even in the presence of key transpositions or changes in instrumentation, tempo, or the like.

To index audio clips, a database of reference intervalgram fingerprints is created from reference audio clips, such as authorized recordings of musical works. The melody recognition system generates the intervalgram representation from an audio chromagram representing the reference audio clip. The system receives (or alternatively generates) the audio chromagram representing the audio clip. The audio chromagram comprises a sequence of vectors with each vector in the audio chromagram corresponding to a different time point of the audio clip. Each vector in the audio chromagram represents a distribution of audio pitch chromas, that is, pitch frequencies transformed to pitch values within an octave, at the corresponding time point of the audio clip. The system selects a sampled set of different reference time points within the audio chromagram. For each of the selected reference time points, the system generates a chroma block having a plurality of vectors with each of the plurality of vectors in the chroma block corresponding to a different time sub-period of the audio clip. Each chroma vector in the chroma block represents a weighted average of distributions of audio pitch chromas within the corresponding time sub-period of the chromagram. For each of the selected reference time points, the system also generates a reference chroma vector representing the reference time point. The system then cross-correlates the vectors of each chroma block against the corresponding reference chroma vector to produce the sequence of intervalgram blocks for the input audio clip, representing musical intervals relative to the pitch chroma at the reference time. The sequence of intervalgram blocks is stored to the reference database as a fingerprint for subsequent matching against input fingerprints generated from unknown audio clips.

For matching, the melody recognition system generates an intervalgram representation fingerprint of an input audio clip (also known as a probe), using the intervalgram generation method. The system then compares the fingerprint for the input audio clip to fingerprints stored in the reference database corresponding to reference audio clips. The system then selects a reference audio clip having a fingerprint that best matches the fingerprint for the input audio clip. The system outputs a recognition result indicative of the best matching reference audio clip.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system, method, and computer readable storage medium generates an audio fingerprint for an input audio clip that is robust to variations in key, instrumentation, and other performance variations. The audio fingerprint represents a melody in the audio clip by representing a sequence of pitch intervals occurring between different times in the audio clip. Reference fingerprints are generated from reference audio clips and stored in a reference database for later searching. An audio fingerprint for an input audio clip can be compared to one or more of the reference fingerprints in the reference database to determine a matching reference audio clip.

System Architecture

Figure 1:
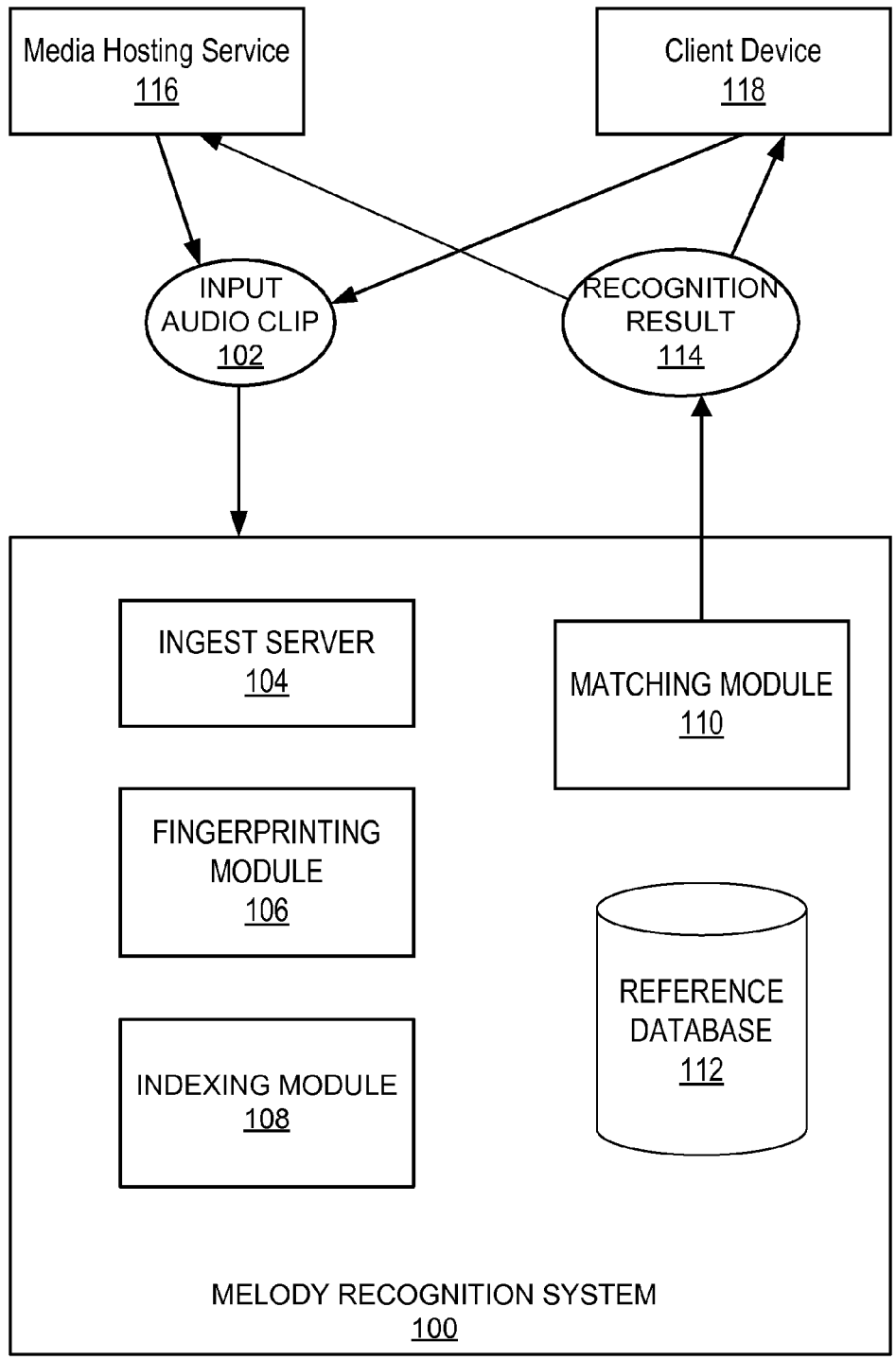
FIG. 1 illustrates an embodiment of a melody recognition system.

FIG. 1 illustrates an environment in which a melody recognition system 100 can operate for recognizing a melody in an input audio clip 102. The system 100 comprises an ingest server 104, a fingerprinting module 106, an indexing module 108, a matching module 110, and a reference database 112. In alternative configurations, the melody recognition system 100 may comprise different or additional modules.

The ingest server 104 receives an input audio clip 102 from an input source. The input audio clip 102 may comprise an audio file encoded in any type of audio codec (e.g., AAC, HE-AAC, MP3, FLAC, ALAC, OGG, WMA, and so forth), and may be an entire audio file (e.g., a recording of a complete musical performance) or a portion of an audio file. Alternatively, the input audio clip 102 may comprise the audio portion of a video file (or a portion of a video file). The input source comprises a media hosting service 116 or a client device 118, communicating with the system 100 over a network (not shown), or a database or other storage device communicatively coupled to the ingest server 104 over a network. In another embodiment, the ingest server 104 couples to an audio capture device (e.g., digital audio recorder) and encodes the input audio clip 102 into a useable file format and provides it to the ingest server 104. The ingest server 104 optionally performs audio processing on the input audio clip 102, for example, to encode the input audio clip 102 to a standardized format or extract the audio portion of a video input.

The fingerprinting module 106 receives the input audio clip 102 from the ingest server 104 and generates an audio fingerprint representing the input audio clip 102. The fingerprint compactly represents the melodic characteristics of the input audio clip 102 in a format that can be efficiently compared and matched to a set of reference fingerprints representing a set of reference melodies. The audio fingerprint beneficially represents the melody in a piece of music such that variations in key, instrumentation, encoding formats, and other recording and processing variations do not substantially affect the fingerprint. The audio fingerprint can then be compared to reference fingerprints in the reference database 112. Furthermore, the audio fingerprint for the input audio clip 102 can be added to the reference database 112 as a new reference fingerprint.

The indexing module 108 indexes the audio fingerprint for storage into the reference database 112. A variety of different indexing schemes can be used, but generally, the indexing scheme is designed to improve the efficiency of comparing and matching an input fingerprint for an input audio clip 102 against the reference fingerprints in the reference database 112. The indexing module 108 stores reference fingerprints to the reference database 112 in their native form for matching, or in a data-reduced form. For example, in one embodiment, the indexing module 108 applies a locality sensitive hashing (LSH) indexing process. In LSH indexing, a set of "index keys" each correspond to a different unique fixed-length byte sequence (e.g., 4 bytes). For each unique byte sequence, the LSH index stores pointers to each of the reference fingerprints that contain that particular byte sequence. Thus, for example, if reference fingerprints A, D, and X each include the 4-byte sequence {A5 B1 43 67}, the LSH index stores pointers to reference audio clips A, D, X in association with the index key {A5 B1 43 67}. The LSH index can be queried by inputting an index key, and the index returns pointers to each reference audio clip containing that particular index key. LSH indexing is just one example of an indexing scheme for indexing the reference fingerprints in the reference database 112. In alternative embodiments, the indexing module 108 can index reference fingerprints according to a different indexing scheme. In one embodiment, the indexing module 108 stores the reference fingerprints in the reference database 112 in their native form without applying any data-reduced indexing.

The matching module 110 compares an input fingerprint representing the input audio clip 102 against reference fingerprints in the reference database 112 to determine the reference melody (or melodies) that best matches the melody (or melodies) in the input audio clip 102. The matching module 110 outputs a recognition result 114 indicating a matching melody or melodies (e.g., a song name). In one embodiment, the matching module 110 matches fingerprints in their native form by comparing a fingerprint representing the input audio clip 102 against reference fingerprints in the reference database 112 using a match metric that provides a figure of merit as to the quality of the match, such as a score, distance, probability, or other measure. For example, in one embodiment, the matching module 110 performs matching using a Euclidian distance or a Mahalanobis distance technique. In other embodiments where the reference fingerprints are indexed using a data-reduced form (e.g., using LSH indexing), the matching module 110 performs matching by extracting features of the input fingerprint (e.g., LSH keys), querying the index for reference fingerprints containing those features, and determining a best match based on a correlation of features. In another embodiment, the matching module 110 applies a dynamic time alignment to look for alignment of matches between the input fingerprint and the reference fingerprints. In yet other embodiments, the matching module 110 performs matching on further data-reduced versions of the fingerprints by for example, sparsifying, binarizing, or wavelet transforming the fingerprints.

In alternative embodiments, the indexing module 108 or matching module 110 receives a fingerprint representation of the input audio clip 102 from a fingerprint source external to the melody recognition system 100 rather than from the fingerprinting module 106. Thus, in some embodiments, the fingerprinting module 106 is omitted, and the ingest server 102 is configured to receive fingerprints representative of an input audio clip 102 rather than the audio clip 102 itself.

The reference database 112 stores reference fingerprints for a plurality of reference audio clips. As discussed above, the reference database 112 may store the fingerprints themselves or a data-reduced form according to an indexing scheme such as LSH indexing. In embodiments where data-reduced indexing is used, the reference fingerprints themselves need not be stored explicitly so long as the index stores sufficient information about the reference fingerprints to perform matching.

Each of the various components (alternatively, modules) of the melody recognition system 100, e.g., ingest server 104, fingerprinting module 106, indexing module 108, matching module 110, and reference database 112 are implemented as part of a server-class computer system with one or more computers comprising a CPU, memory, network interface, peripheral interfaces, and other well known components. The computers themselves preferably run an operating system (e.g., LINUX), have generally high performance CPUs, 1 G or more of memory, and 100 G or more of disk storage. Of course, other types of computers can be used, including personal and handheld computers when the database is not too big for them, and it is expected that as more powerful computers are developed in the future, they can be configured in accordance with the teachings here. Generally, the modules comprise computer-executable program instructions stored on a non-transitory computer readable storage medium (e.g., a hard disk). In operation, the computer-executable program instructions are loaded into a memory and executed by one or more processors included as part of the system 100. When configured to execute the various operations described herein, a general purpose computer becomes a particular computer, as understood by those of skill in the art, as the particular functions and data being stored by such a computer configure it in a manner different from its native capabilities as may be provided by its underlying operating system and hardware logic. An example of a melody recognition system 100 may be implemented as part of a media hosting system such as, for example, the YOUTUBE™ website; other media hosting systems are known as well, and can be adapted to operate according to the teachings disclosed herein. It will be understood that the named components of the melody recognition system 100 described herein represent one embodiment of the present invention, and other embodiments may include other components. In addition, other embodiments may lack components described herein and/or distribute the described functionality among the modules in a different manner. Additionally, the functionalities attributed to more than one component can be incorporated into a single component.

Audio Fingerprinting Process

Figure 2:
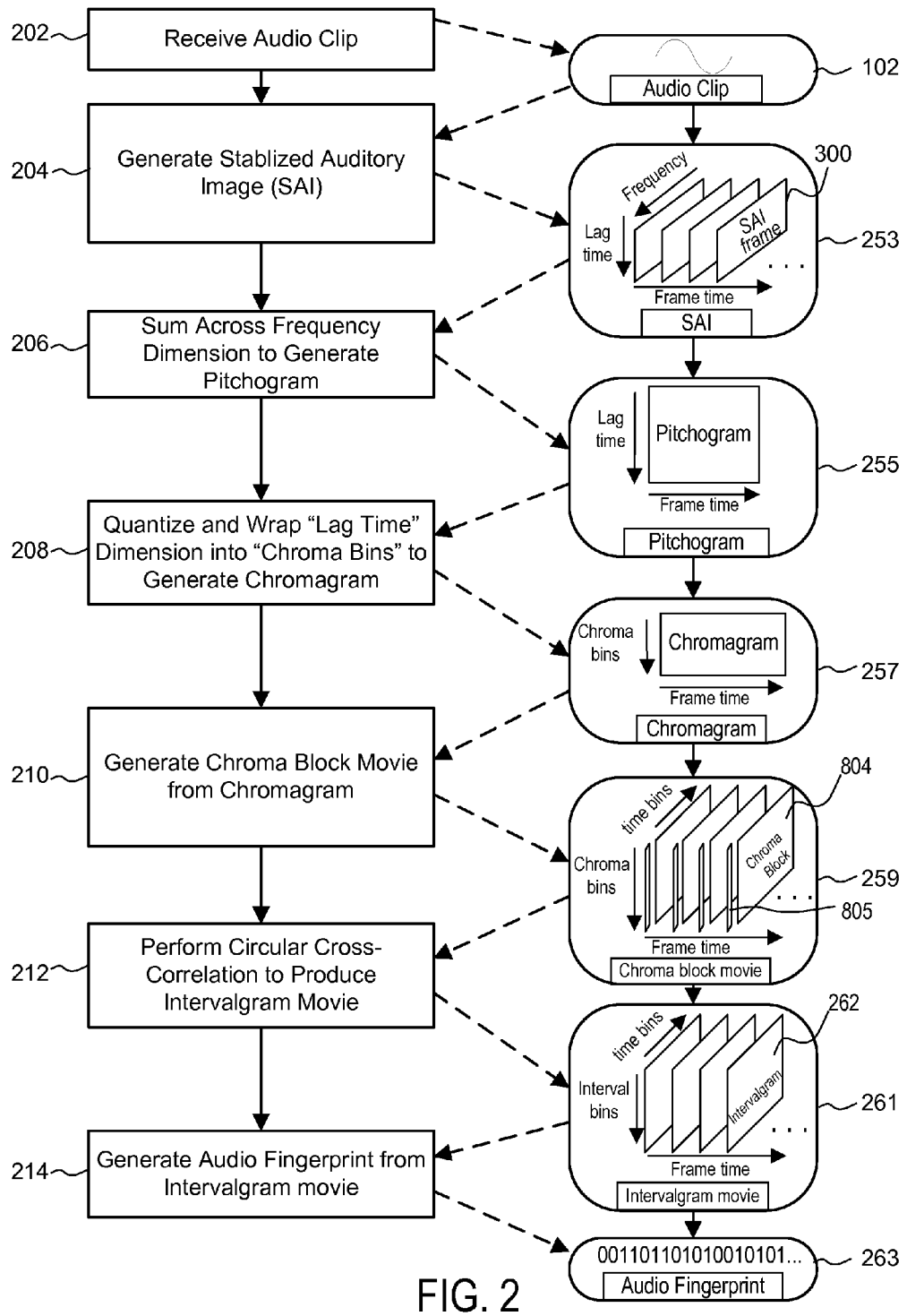
FIG. 2 illustrates an embodiment of a process for generating an audio fingerprint for an input audio clip.

FIG. 2 illustrates an embodiment of a process performed by the fingerprinting module 106 for generating an audio fingerprint for melody recognition. On the left side of FIG. 2 there are shown the major processing steps, and the right side are schematic representations of the data that is generated by each step and input to the next.

The fingerprinting module 106 receives 202 the input audio clip 102. The fingerprinting module 106 then generates 204 a Stabilized Auditory Image (SAI) 253 representing the audio clip 102. The SAI 253 is a "movie" comprising a sequence of SAI frames 300 with a fixed time period between each SAI frame 300 (e.g., SAI frames 300 may be generated at a rate of 50 frames per second (fps)). The reference to the SAI 253 as "movie" here is simply to provide a convenient metaphor for understanding the temporal structure of the SAI, which allows for, but does not require that the SAI 253 be visually displayed, or that each frame be visualized as an individual image. Each frame 300 of the SAI 253 corresponds to a particular time point in the input audio clip 102. The SAI 253 represents the input audio clip 102 using a model designed to simulate how the human auditory system processes and represents sound. Humans perceive events by receiving information in the form of light and sound waves. Just as the human visual system forms a visual image of the visual aspects of the event, the human auditory system forms an "auditory image" (i.e., an SAI frame 300) of the auditory aspects of the event.

Each frame 300 of the SAI 253 corresponds to an instantaneous time point in the input audio clip 102 and comprises a signal pattern representing characteristics of the perceived sound at that time point. When a sound in the input audio clip 102 is "stationary" for a particular period of time (i.e. the human auditory system would perceive a stable constant sound), this signal pattern in the SAI 253 is stationary over the corresponding sequence of frames 300 for the time period. When a sound in the input audio clip 102 changes abruptly between a first time period and a second period, the signal pattern of the initial sound changes quickly in the SAI 253 and is replaced by a signal pattern representing the new sound. If sounds in the input audio clip 102 changes smoothly from a first time period to a second time period, the signal pattern in the SAI 253 changes smoothly between the SAI frames 300 corresponding to the first and second time periods.

Figure 3:
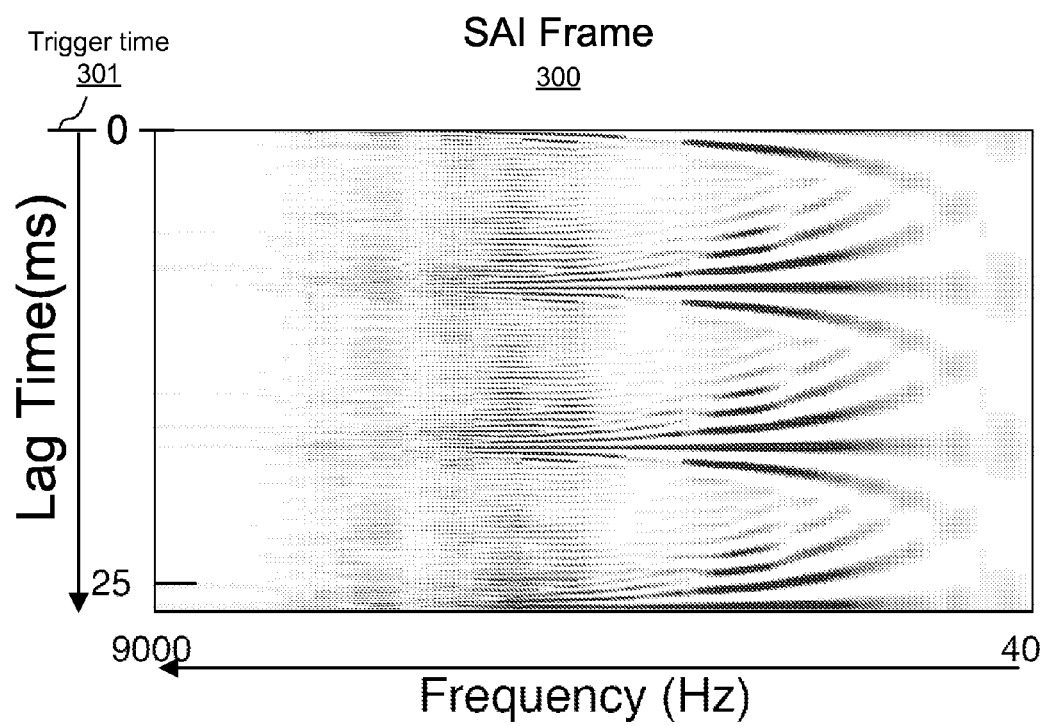
FIG. 3 illustrates an example of a Stabilized Auditory Image (SAI) frame representing a portion of an audio clip.

FIG. 3 illustrates an example SAI frame 300 in further detail. The SAI frame 300 is a two-dimensional data structure having dimensions of "lag time" and frequency. The lag time is measured with respect to a trigger time 301. The trigger time 301 occurs periodically during the SAI generation process, at prominent signal peaks within each frequency channel, one or more times per generated SAI frame 300. Each data point in the SAI frame 300 represents a weighted averaging of the frequency-filtered sound waveforms for a particular frequency occurring over intervals displaced from the trigger times by a corresponding lag time. The SAI 253 thus utilizes triggering and averaging to stabilize periodic or nearly-periodic signals over time, similarly to how an oscilloscope stabilizes electrical signals. The particular example SAI frame 300 in FIG. 3 illustrates the signal pattern for a sung vowel sound, a nearly periodic sound comprising a number of different frequency components. The presence of a repeated regular pattern in the SAI 300 is perceived as a consistent tonal sound. The lag time spacing of the patterns reveals the pitch of the sound. The spacing decreases as the pitch increases, and vice versa. The auditory image is further described in Patterson, "Auditory Images: How Complex Sounds are Represented in the Auditory System," *Acoustical Science and Technology*, Jpn (E). 21:183-190 (2000).

In one embodiment, the fingerprinting module 106 applies a multistep process to generate the SAI 253. First, the fingerprinting module 106 applies a cochlear model to the input audio clip 102. A example of a cochlear model is described in Lyon, "A Computational Model of Filtering, Detection, and Compression in the Cochlea", *Proceedings IEEE International Conference on Acoustics, Speech, and Signal Processing*, Paris, May 1982. The cochlear model transforms the input audio clip 102 into a multichannel neural activity pattern (NAP) like that observed in the auditory nerve. In one embodiment, the cochlear model comprises a gammatone auditory filterbank that performs spectral analysis and converts the input audio clip 102 into a simulation of basilar membrane motion. A transducing unit then simulates neural transduction performed in the cochlea to convert the simulated membrane motion into the multi-channel NAP. An integration unit applies a strobed temporal integration to the NAP to simulate how the brain interprets variations in audio signals over time. In the SAI frame 300, the horizontal axis represents the frequency channels of the NAP signal. The integration unit stabilizes the NAP signal into a stable image by using a triggering process to align prominent peaks to a zero-lag position and, like an oscilloscope, produces a static image of a repeating temporal pattern as long as the signal is stationary. A further description of gammatone auditory filterbanks is found in Katsiamis et. al, "Practical Gammatone-Like Filters for Auditory Processing," EURASIP Journal on Audio, Speech, and Music Processing, v. 2007, Article ID 63685.

Figure 4:
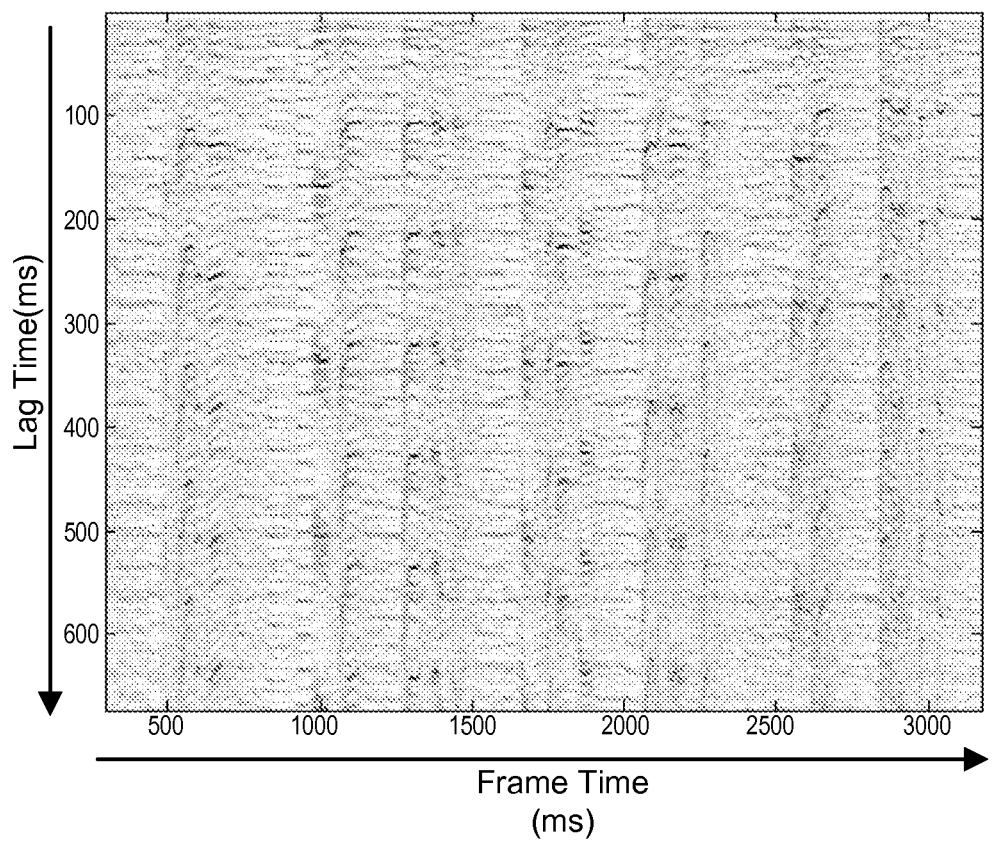
FIG. 4 illustrates an example of a pitchogram representing an audio clip.

Referring back to FIG. 2, the frequency dimensions of each SAI frame 300 are collapsed by summing 206 the intensity values across the frequency dimension at each lag time (in regards to FIG. 3, this may be thought of as summing, at each lag time T, a row of intensity values). This step is repeated for each SAI frame 300. The SAI 253 is thus reduced from a three-dimensional data structure to a two-dimensional data structure called a "pitchogram" 255 having dimensions of frame time and lag time. FIG. 4 illustrates an example of a pitchogram 255 in further detail. The pitchogram 255 comprises a sequence of vectors with each vector corresponding to a particular time point (a frame time) in the input audio clip 102. In the context of FIG. 4, a vector corresponds to a vertical slice of the pitchogram at a particular time. The entries in each vector correspond to an intensity value representing the input audio clip 102 periodicity at a particular time lag or pitch period, approximately as would be perceived by the human ear. The intensity values in a given vector at a given frame time are the summed intensity values from the corresponding SAI frame 300. Where signals values in the pitchogram 255 are relatively high, the time lag dimension corresponds to a possible perceivable pitch. Thus, each vector in the pitchogram 255 generally represents a distribution of pitches (i.e. the relative intensities of different pitches) across a large portion of the audible spectrum at a given time point in the input audio clip 102, approximately as it would be perceived the human ear. In one embodiment, the fingerprinting module 106 optimizes steps 204 and 206 to compute the pitchogram 255 directly from the input audio clip 102 without explicitly constructing or storing the SAI 253.

Figure 5:
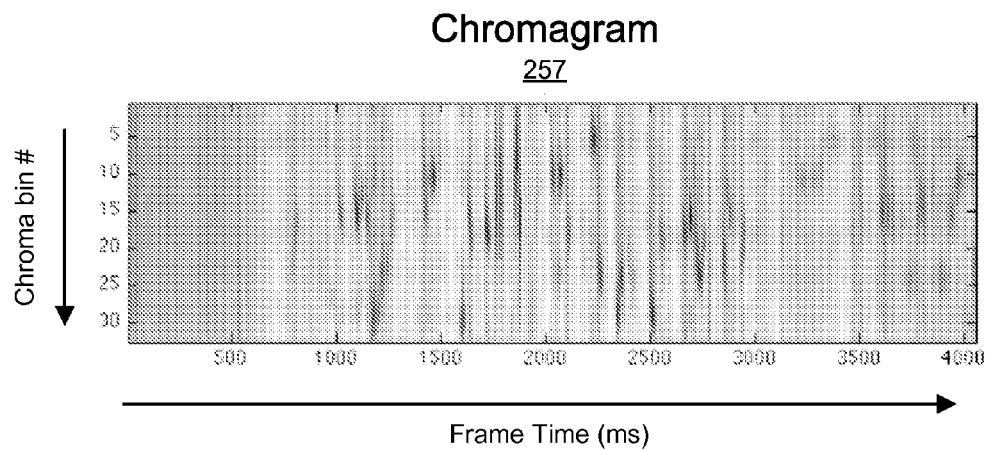
FIG. 5 illustrates an example of a chromagram representing an audio clip.

The lag time dimension of the pitchogram 255 is quantized and wrapped 208 into a number of "chroma" bins. Each chroma bin represents a particular pitch within an octave, without regard to which octave the pitch occurred. For example, in one embodiment, 12 chroma bins are used, with each chroma bin corresponding to one of the twelve named notes, or semitones, in a chromatic scale without regard to octave. Alternatively, a finer quantization can be applied, using for example, anywhere between 12 and 36 chroma bins. Using a resolution higher than 12 provides a smoother representation of instrumental music and singing, particularly for music in unknown or variable tunings The quantization and wrapping step 208 is equivalent to mapping each lag time in the pitchogram 255 to the fractional part of the base-2 logarithm of the lag time value, quantized to the desired resolution. The resulting two-dimensional data structure, called a "chromagram" 257 has dimensions of frame time and chroma bin. FIG. 5 illustrates an example of a chromagram 500 in more detail. The chromagram 257 comprises a sequence of vectors with each vector corresponding to a different time point of the input audio clip 102. Each vector of the chromagram 257 represents a distribution of pitches (i.e., the relative intensity values of each pitch) independent of octave at the corresponding time point of the audio clip, approximately as would be perceived by the human ear. By way of comparison, whereas the pitchogram represents the pitch intensity across the audio spectrum, the chromagram represents just the pitch intensity distribution across a normalized octave. This aids in making the fingerprint invariant to changes in key or instrumentation.

Figure 6:
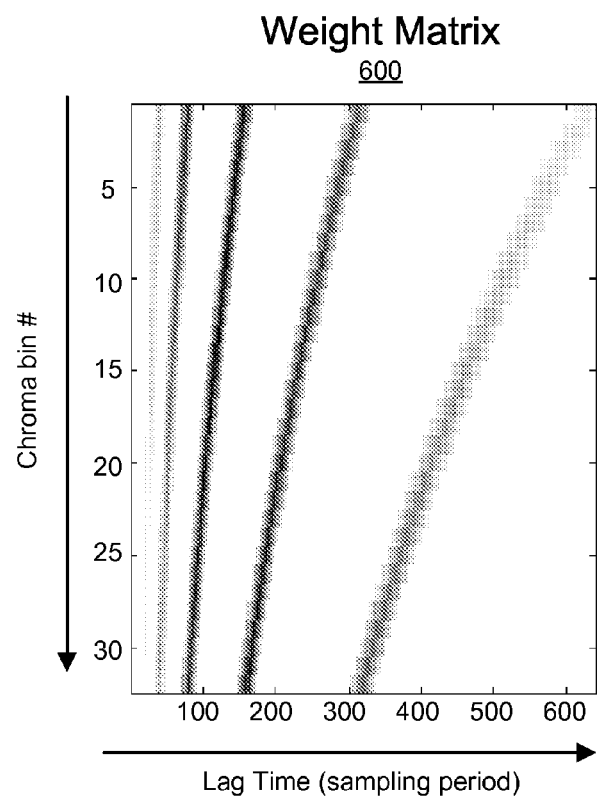
FIG. 6 illustrates an example embodiment of a weight matrix for transforming a pitchogram to a chromagram.

In one embodiment, the quantization and wrapping step 208 is implemented by applying a transform function to the pitchogram 255. For example, in one embodiment, the pitchogram 255 is multiplied by a two-dimensional transform matrix that maps the lag time in the pitchogram 255 to the chroma bins. In one embodiment, the transform matrix comprises a weight matrix that smoothes the mapping from the lag time dimension of the pitchogram 255 to the chroma bin dimension of the chromagram 257. The weight matrix is a sparse (that is, mostly zero-valued) matrix of weights, with as many rows as chroma bins (e.g. 32 bins) in the chromagram 257 and as many columns as lag times in the pitchogram 254 (e.g. 630 times). The weight matrix has non-zero values at row-column combinations that correspond to pairs of lag time and chroma bin that are approximately related by the described mapping of the fractional part of the base-2 log of the lag time to chroma. The weight matrix is a general formulation that allows the intensity at a lag time to contribute to several neighboring chroma bins, rather than quantizing to a single closest bin. In one embodiment, the weight matrix is implemented as an adaptation of a general non-uniform resampling method. Each row of the weight matrix corresponds to a chroma bin and has non-zero elements for those lag times that provide support for the corresponding chroma. For example, a row corresponding to a 100 Hz pitch chroma would have weights from lag times of 10 msec ($\frac{1}{100}$ second), but also from the octave-related lag times of 1.25, 2.5, 5, 20, and 40 milliseconds, and also from lag times close to those mentioned above (e.g., approximately 19 to 21 milliseconds). Generally, lag times overlapping those that map to the next higher and lower chroma bins are included to achieve desired smoothing effect. The sparseness of the matrix is typically exploited to make the mapping from lag times to chroma bins more efficient than a brute-force matrix mulitiplication, as is well known in the art of matrix computations. FIG. 6 illustrates one example embodiment of a weight matrix 600 having the characteristics discussed above for transforming a pitchogram having 630 lag times to a chromagram having 32 chroma bins. The unit of lag time in the weight matrix 600 is the sampling period of the auditory model that produces the SAI 253, for example $\frac{1}{22050}$ second in one embodiment.

Next, the fingerprinting module 106 generates 210 a chroma block movie 259 from the chromagram 257. The chroma block movie 259 comprises a sequence of chroma blocks 804 and a corresponding sequence of reference vectors 805. A series of reference times are selected within the chromagram 257 at a rate of, for example, 1 to 10 reference times per second. For each reference time, a reference vector 805 is generated from a weighted average of the chroma vectors within a time period surrounding the reference time. In one embodiment, the time period is selected to correspond to the approximate length of a typical musical note. For example, assuming an original frame rate of 50 frames/second, a window size of 16-20 frames centered around the reference time works well because it corresponds to about 200-500 milliseconds. Again, the reference to a "movie" here is simply to provide a convenient metaphor for understanding the temporal structure of the chroma block sequence 259, which allows for, but does not require that the chroma block be visually displayed, or that each frame be visualized as an individual image.

Figure 7:
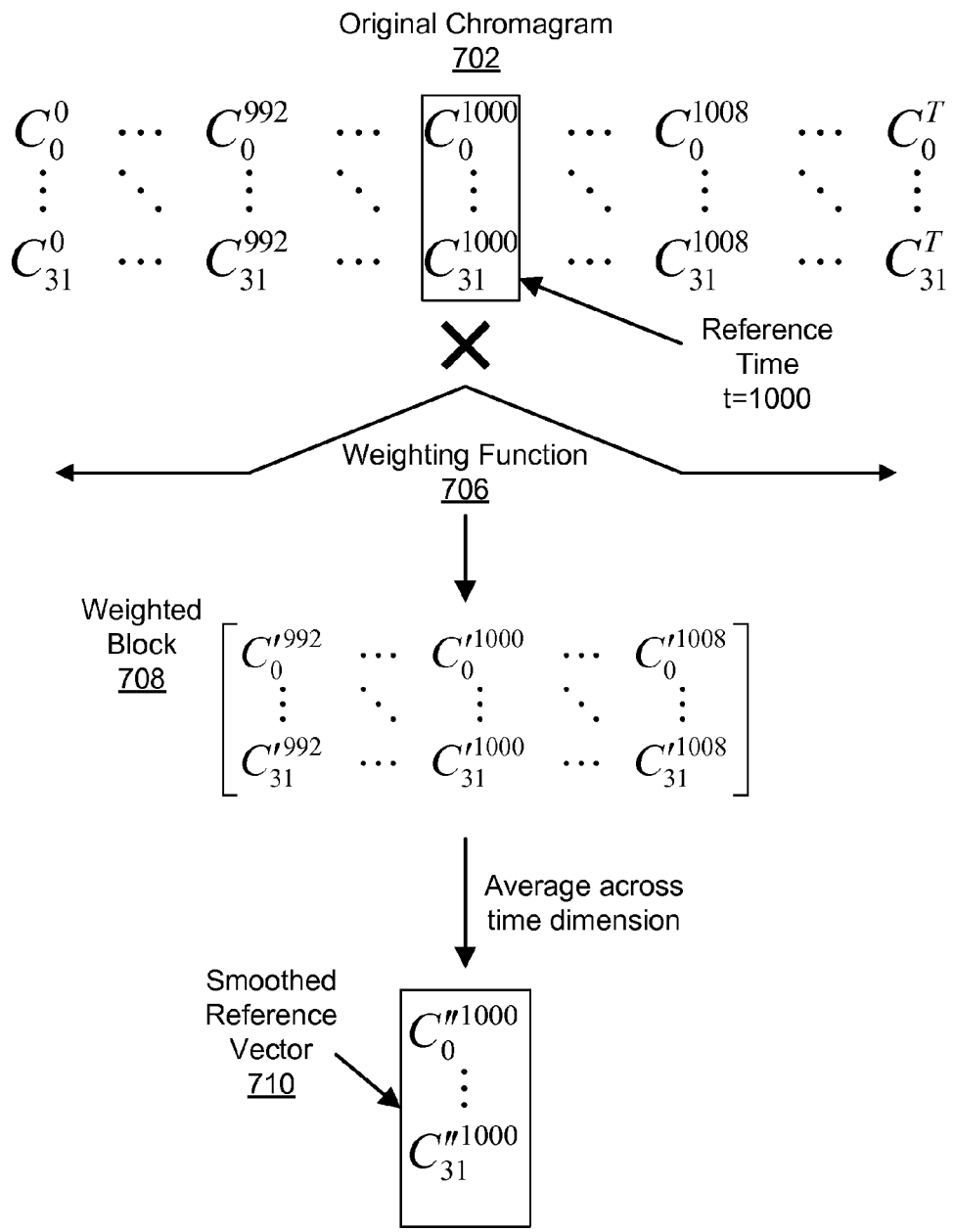
FIG. 7 illustrates an embodiment of a process for generating a reference vectors from a chromagram.

FIG. 7 illustrates an example of a process for generating the reference vector 805 for each reference time. In this example, a chromagram 702 is represented as a matrix C having 32 chroma bins (rows) and time length of T (columns). For the sake of example, a reference time of t=1000 is selected. A weighted average of the chroma vectors around the reference time t=1000 is computed using the chroma vector at the reference time $C^{1000}$, and some number, e.g., 8, vectors before and after the reference time (the vectors $\{C^{992} \ldots C^{1008}\}$). In one embodiment, weights are distributed according to a triangle weighting function 706 with the weights linearly decaying to zero beyond both ends of the time range, $\{t=992, t=1008\}$. Thus, the chromagram 702 is multiplied by the triangle weighting function 706 centered at the reference time, t=1000, yielding an intermediate matrix C' (weighted block 608). The weighted block 608 is then summed across time to generate the smoothed reference vector 710 corresponding to the reference time t=1000. Reference vectors are computed in the same manner for each of the selected reference times (spaced, for example, 1 to 10 per second) to generate the sequence of reference vectors 805. In alternative embodiments, different weighting functions can be used. The result of this operation is a sequence of reference vectors 805 sub-sampled in time in relation to the original chromagram 257. The smoothing and weighted averaging process can be implemented in an optimized fashion without requiring separate computation of the weighted block 608.

Figure 8:
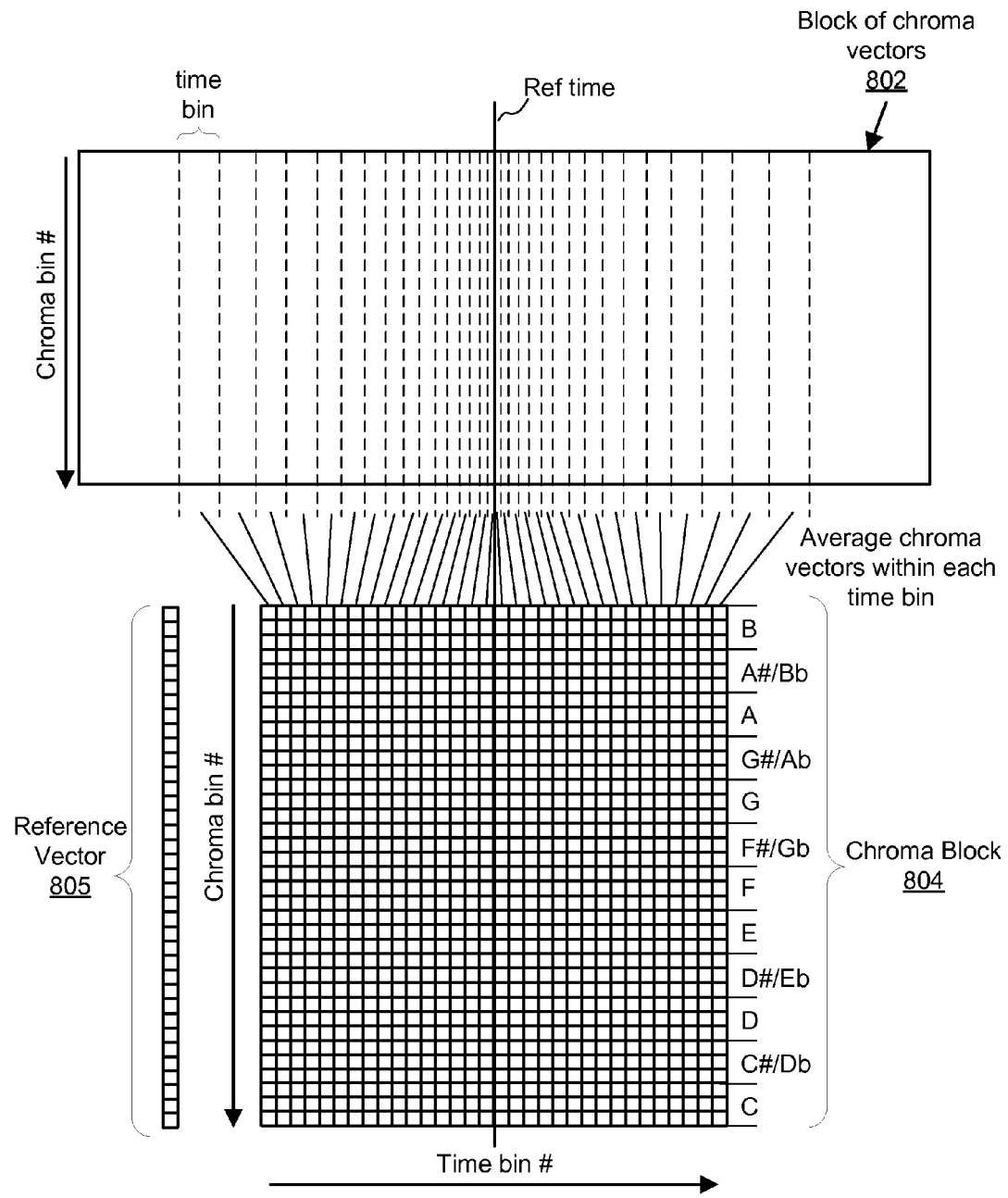
FIG. 8 illustrates an embodiment of a process for generating a chroma block from a block of chroma vectors.

FIG. 8 illustrates an example of a process for generating the sequence of chroma blocks 804 corresponding to each reference time. For each reference time, a block of the chromagram is extracted and averaged over non-uniform time bins along the frame time dimension. In this operation, a block 802 of chroma vectors (e.g., 10 to 30 seconds worth) centered around each reference time are sampled down to a number of vector samples (e.g., 16 to 64 samples each per 10 to 30 second block). In some embodiments, the time periods corresponding to each block of chroma vectors may partially overlap. The block of chroma vectors 802 comprises a number of time sub-periods (time bins). The sampling operation averages the chroma vectors within each time bin across time. Typically, the sampling operation is non-uniform, i.e. the time bins are non-uniform in width. For example, in one embodiment, time bins near the reference time are narrower (e.g., on the order of the width of the width of the triangular weighting function 706 described above), and gradually get wider for each bin step away from the reference time (e.g., by about 10% per step). Thus, for example, bins 15 steps away from the reference time are wider by a factor of about 4 and therefore encompass more notes. For each time bin, the sampling operation averages the chroma vectors within the width of the time bin. In one example, 32 time bins are used, with bin widths of 18, 20, 23, 25, 28, 32, 36, 39, 45, 50, 56, 62, 71, 78, 88, and 99 frames respectively as the bins get further away from the reference time. Assuming a frame rate of 50 frames/second, samples immediately before and after the reference time will therefore have a bin width of 360 milliseconds, while bins at the extreme edges have a bin width of 1980 milliseconds. After the averaging operation, the resulting data structure is called a "chroma block" 804 and has dimensions of time bin and chroma bin. In FIG. 8, the chroma block is shown having 36 chroma bins, for ease of an illustrative relationship to the twelve note names; such an alignment of bins with named notes is not a requirement, so an arbitrary number of bins may be used, such as 32.

Each chroma block 804 thus has a plurality of vectors representing a time period of the input audio clip. In some embodiments, the time periods corresponding to each chroma block 804 may partially overlap. Each of the plurality of vectors in the chroma block 804 corresponds to a different time sub-period (time bin) of the input audio clip 102. Each vector in the chroma block 804 represents a distribution of audio pitches (i.e. relative intensities of the different pitches independent of octave) within the corresponding time sub-period, and these pitches are wrapped to chroma independent of octave. A chroma block 804 is generated in this manner for each reference time, creating the chroma block movie 259 as a time-ordered sequence of chroma blocks 804.

Within each chroma block 804, a circular cross-correlation is performed 212 between the vectors of the chroma block 804 and the reference vector 805 (e.g., smoothed reference vector 710) corresponding to the reference time for the chroma block 804. This cross-correlation uses the reference vector 805 at the reference time for the chroma block 804 as a set of weights, or probabilities for all possible different pitches. The cross-correlation operation produces, for each vector in the chroma block 804, a measure of similarity between the vector and the reference vector 805 as a function of the chroma bin offset between the vector and the reference vector 805. The cross-correlation is computed as a set of sliding circular dot products between each vector and the reference vector 805. The cross-correlation is circular in that the vectors wrap around the chroma bin dimension for each shift of the cross-correlation. The cross-correlation thus converts the chroma block 804 from a representation of pitch distribution to a representation of interval distribution with respect to the possible pitches of the reference vector 805. This further aids in extracting the melodic structure of the audio input independent of key transposition, instrumentation or tempo, since it captures the characteristic distribution of intervals between pitches, which underlies any melodic structure, apart from the actual pitches (notes) themselves. Optionally, the blocks are then smoothed across time bins by replacing each vector with a weighted average of the vector and a number of adjacent vectors. For example, in one embodiment, each vector is replaced by a vector comprising the weighted average between the vector and the vectors directly before and after using weights of, for example, 0.5, 0.25, and 0.25 respectively. This secondary smoothing smears some of the details and may allow for better matching when tempos of songs are not precisely matched. Alternatively, this smoothing operation can be applied prior to the cross-correlation.

In an alternative embodiment, a different reference vector 805 can be used for performing the cross-correlation other than the smoothed reference vector 710 generated in the process of FIG. 7. For example, in one embodiment, instead of using the smoothed reference vector 710, the cross-correlation is computed against a reference vector 805 representing the average chroma of the whole chroma block 804. Like the smoothed reference vector 710, the average chroma can serve as a proxy for an unknown key pitch. The actual technique for obtaining the proxy can vary so long as the approach still captures the characteristic distribution of intervals between pitches. In another embodiment, hypotheses can first be formulated about the likely key pitches of the input audio clip 102, and the cross-correlation is then performed against a sparse vector representing probabilities of the hypothesized key pitches.

Each converted block is called an "intervalgram" 262 (alternatively, "intervalgram block") and has dimensions of time bin and interval bin, where each interval bin represents a different pitch interval relative to the distribution of pitches in the corresponding reference vector 805. Since there are is sequence of chroma blocks, there results a corresponding sequence of intervalgrams. The sequence of intervalgrams 262 forms an intervalgram movie 261 representing the underlying melodic structure of the audio clip. (Again, the reference to a "movie" here is merely to provide an understanding of the temporal structure of the intervalgram.) Each intervalgram 262 is associated with a different time period within the audio clip 102 and each intervalgram 262 represents the distribution of pitch intervals occurring between different sub-periods within the intervalgram time period. In some embodiments, the time periods corresponding to each intervalgram 262 may partially overlap.

The intervalgram movie 261 beneficially represents the melody of the audio clip in a compact form by extracting the sequence of pitch intervals occurring in the audio clip that formulate the melody. Because the intervalgram movie 261 is based on the interval sequence, differences in key, instrumentation, tempo, and minor performance variations do not substantially change the intervalgram movie 261. Thus, intervalgrams movies 261 can be compared to recognize a particular song even when the recordings are not identical (e.g., matching a cover recording to the original).

The intervalgram movie 261 can be used directly 214 as an audio fingerprint 263, or can be flattened to a bit vector to form the final audio fingerprint 263, for example by concatenating and then linearizing the individual intervalgrams.

Referring again to FIG. 1, the above process for audio fingerprinting can be performed in various contexts. First, reference audio clips are processed by the system 100 and the resulting reference fingerprints are stored in the reference database 112. Second, to recognize an unknown or probe audio clip, the audio clip is processed by the system 100 and matched by the matching module 110 against reference fingerprints in the database 112. Alternatively, the system 100 can receive a fingerprint in an intervalgram representation representative of an input audio clip, and matched by the matching module against reference fingerprints in the database 112.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs stored in a memory and executed by one or more processors. Furthermore, it has also proven convenient at times, to refer to these arrangements of operations as modules or code devices, without loss of generality.

Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for matching audio clips, the method executed by a computer system, and comprising:

receiving an intervalgram representation for an input audio clip, the intervalgram representation comprising a sequence of intervalgram blocks, each intervalgram block associated with a different time period within the input audio clip, and each intervalgram block having a plurality of vectors, each vector of the intervalgram block representing a cross-correlation between a distribution of audio pitches occurring during a sub-period within the time period and a reference distribution associated with the time period, each distribution of audio pitches representing relative intensities of a plurality of different audio pitches present within a corresponding sub-period;

comparing, by a computing device, the intervalgram representation for the input audio clip to stored intervalgram representations corresponding to reference audio clips in a reference database;

selecting a reference audio clip from the reference database having an intervalgram representation best matching the intervalgram representation for the input audio clip; and generating a recognition result indicative of the selected reference audio clip.

2. The method of claim 1, further comprising, prior to receiving the intervalgram representation, generating the intervalgram representation, wherein generating the intervalgram representation comprises:

receiving an audio chromagram representing the input audio clip, the audio chromagram comprising a sequence of vectors, each vector in the audio chromagram corresponding to a different time point of the input audio clip, and each vector representing a distribution of audio pitches at the corresponding time point of the input audio clip; and generating the intervalgram representation based on the audio chromagram.

3. The method of claim 2, further comprising generating a chroma block from the audio chromagram, each chroma block corresponding to a different time sub-period, and each chroma block representing a weighted average of distributions of audio pitches within the corresponding time sub-period, wherein generating the chroma block comprises:

extracting a block of chroma vectors from the chromagram, the block of chroma vectors corresponding to one of the different time periods within the input audio clip; and averaging the chroma vectors in the block of chroma vectors across time into a number of time bins, each time bin corresponding to a different time sub-period in the chroma block.

4. The method of claim 3, wherein averaging the chroma vectors in the block of chroma vectors comprises applying a non-uniform sub-sampling such that time bins near the reference time are narrower than time bins at the edges of the block of chroma vectors.

5. The method of claim 2, further comprising generating the audio chromagram, wherein generating the audio chromagram comprises:

receiving a pitchogram comprising a sequence of vectors, each vector corresponding to a different time point in the input audio clip, and each vector in the pitchogram representing a distribution of pitches at the time point in the input audio clip; and quantizing and wrapping the distribution of pitches in of the sequence of vectors in the pitchogram into a number of chroma bins according to a weighted smoothing function, wherein each chroma bin represents a pitch independent of octave.

6. The method of claim 1, further comprising generating the reference vector, wherein generating the reference vector comprises computing a weighted average of a plurality of chroma vectors within a limited time range surrounding a reference time, each chroma vector comprising a distribution of audio pitches at a occurring at a particular time point in the input audio clip.

7. The method of claim 6, wherein computing the weighted average of the plurality of chroma vectors comprises applying a triangle weighting function to the plurality of chroma vectors.

8. The method of claim 1, further comprising storing the intervalgram representation for the input audio clip to the reference database as an additional reference fingerprint.

9. A non-transitory computer readable storage medium storing computer-executable program instructions for matching audio clips, the program instructions when executed cause a processor to perform steps of:

receiving an intervalgram representation for an input audio clip, the intervalgram representation comprising a sequence of intervalgram blocks, each intervalgram block associated with a different time period within the input audio clip, and each intervalgram block having a plurality of vectors, each vector of the intervalgram block representing a cross-correlation between a distribution of audio pitches occurring at a sub-period within the time period and a reference distribution associated with the time period, each distribution of audio pitches representing relative intensities of a plurality of different audio pitches present within a corresponding sub-period;

comparing the intervalgram representation for the input audio clip to stored intervalgram representations corresponding to reference audio clips in a reference database;

selecting a reference audio clip from the reference database having an intervalgram representation best matching the intervalgram representation for the input audio clip; and generating a recognition result indicative of the selected reference audio clip.

10. The non-transitory computer-readable storage medium of claim 9, further comprising prior to receiving the intervalgram representation, generating the intervalgram representation, wherein generating the intervalgram representation comprises:

receiving an audio chromagram representing the input audio clip, the audio chromagram comprising a sequence of vectors, each vector in the audio chromagram corresponding to a different time point of the input audio clip, and each vector representing a distribution of audio pitches at the corresponding time point of the input audio clip; and generating the intervalgram representation based on the audio chromagram.

11. The non-transitory computer-readable storage medium of claim 10, wherein the program instructions further include instructions for generating a chroma block from the audio chromagram, each chroma block corresponding to a different time sub-period, and each chroma block representing a weighted average of distributions of audio pitches within the corresponding time sub-period, wherein generating the chroma block comprises:

extracting a block of chroma vectors from the chromagram, the block of chroma vectors corresponding to one of the different time periods within the input audio clip; and averaging the chroma vectors in the block of chroma vectors across time into a number of time bins, each time bin corresponding to a different time sub-period in the chroma block.

12. The non-transitory computer-readable storage medium of claim 11, wherein averaging the chroma vectors in the block of chroma vectors comprises applying a non-uniform sub-sampling such that time bins near the reference time are narrower than time bins at the edges of the block of chroma vectors.

13. The non-transitory computer-readable storage medium of claim 10, wherein the program instructions further include instructions for generating the reference vector, wherein generating the reference vector comprises computing a weighted average of a plurality of chroma vectors within a limited time range surrounding a reference time, each chroma vector comprising a distribution of audio pitches at a occurring at a particular time point in the input audio clip.

14. The non-transitory computer-readable storage medium of claim 13, wherein computing the weighted average of the plurality of chroma vectors comprises applying a triangle weighting function to the plurality of chroma vectors.

15. The non-transitory computer-readable storage medium of claim 10, further comprising program instructions for generating the audio chromagram, wherein generating the audio chromagram comprises:
   receiving a pitchogram comprising a sequence of vectors, each of the vectors corresponding to a different time point in the input audio clip, and each vector in the pitchogram representing a distribution of pitches at the time point in the input audio clip; and
   quantizing and wrapping the distribution of pitches in of the sequence of vectors in the pitchogram into a number of chroma bins according to a weighted smoothing function, wherein each chroma bin represents a pitch independent of octave.

16. The non-transitory computer-readable storage medium 9, further comprising storing the intervalgram representation for the input audio clip to the reference database as an additional reference fingerprint.

* * * * *

UNITED STATES PATENT AND TRADEMARK OFFICE
CERTIFICATE OF CORRECTION

| | |
|---|---|
| PATENT NO. | : 8,497,417 B2 |
| APPLICATION NO. | : 13/416096 |
| DATED | : July 30, 2013 |
| INVENTOR(S) | : Richard F. Lyon, Thomas C. Walters and David A. Ross |

It is certified that error appears in the above-identified patent and that said Letters Patent is hereby corrected as shown below:

In the Claims

Column 15, line 1, delete "audio pitches at a occurring" and insert --audio pitches occurring--.

Column 15, line 21, after "storage medium," insert --of claim--.

Signed and Sealed this
Twelfth Day of August, 2014

Michelle K. Lee
*Deputy Director of the United States Patent and Trademark Office*